(12) United States Patent
Fenske et al.

(10) Patent No.: US 7,529,610 B1
(45) Date of Patent: May 5, 2009

(54) BRAKE INTERFACE MODULE

(75) Inventors: James L. Fenske, Marion, IA (US);
John A. Raid, Cedar Rapids, IA (US);
Peter E. Tilly, Cedar Rapids, IA (US)

(73) Assignee: Wabtec Holding Corp., Wilmerding, PA (US)

( * ) Notice: Subject to any disclaimer, the term of this patent is extended or adjusted under 35 U.S.C. 154(b) by 0 days.

(21) Appl. No.: 12/342,275

(22) Filed: Dec. 23, 2008

Related U.S. Application Data

(63) Continuation of application No. 11/331,427, filed on Jan. 12, 2006, now Pat. No. 7,472,011.

(60) Provisional application No. 60/643,288, filed on Jan. 12, 2005.

(51) Int. Cl.
*B60T 13/00* (2006.01)
*G06F 19/00* (2006.01)

(52) U.S. Cl. .............. 701/70; 701/19; 701/33; 303/7; 303/15; 246/167 R

(58) Field of Classification Search .......... 701/70, 701/19, 29, 33, 35, 76; 303/3, 7, 20, 15; 246/167 R; 73/121
See application file for complete search history.

(56) References Cited

U.S. PATENT DOCUMENTS

| | | |
|---|---|---|
| 5,335,974 A | 8/1994 | Klink |
| 5,647,562 A | 7/1997 | Lumbis et al. |
| 6,098,006 A | 8/2000 | Sherwood et al. |
| 6,318,811 B1 | 11/2001 | Root et al. |
| 6,347,840 B1 | 2/2002 | Marra et al. |
| 6,435,624 B1 | 8/2002 | Kull et al. |
| 6,457,782 B1 | 10/2002 | Truglio et al. |
| 6,484,085 B2 | 11/2002 | Marra et al. |
| 6,609,767 B2 | 8/2003 | Mortenson et al. |
| 6,626,034 B2 | 9/2003 | Marra et al. |
| 6,648,422 B2 | 11/2003 | Root et al. |
| 6,746,087 B1 | 6/2004 | Reynolds et al. |
| 2001/0015575 A1 | 8/2001 | Truglio et al. |
| 2002/0147538 A1 | 10/2002 | Marra et al. |
| 2004/0090111 A1 | 5/2004 | Root et al. |
| 2007/0063578 A1 | 3/2007 | Reynolds et al. |
| 2007/0236077 A1 | 10/2007 | Schweikert et al. |
| 2007/0290550 A1 | 12/2007 | Knornschild et al. |
| 2008/0149781 A1 | 6/2008 | Root et al. |

*Primary Examiner*—Tan Q Nguyen
(74) *Attorney, Agent, or Firm*—The Webb Law Firm

(57) ABSTRACT

A brake interface module for an electronic air brake (EAB) or a magnet valve that incorporates positive train control digital commands with additional fail-safe, discrete train control spare inputs into a single, fail safe output via redundant power supplies. The brake interface module comprises a positive train control circuitry including a first microcontroller and a second microcontroller operatively coupled to each other. The brake interface module also includes spare discrete inputs that utilize fail-safe principles and are continuously monitored by the second microcontroller to achieve fail-safe performance. Each power supply contains redundant, independent means of shutting down to facilitate self test.

20 Claims, 3 Drawing Sheets

BRAKE INTERFACE MODULE

CROSS REFERENCE TO RELATED APPLICATION

This application is a continuation of U.S. application Ser. No. 11/331,427, filed Jan. 12, 2006, which claims priority from U.S. Provisional Patent Application No. 60/643,288, filed Jan. 12, 2005, entitled "Redundant, Testable, Vital Brake Interface to Electronic Air Brake or Magnet Valve", which is incorporated herein by reference.

BACKGROUND OF THE INVENTION

1. Field of the Invention

The present invention is directed, in general, to a brake interface to an electronic air brake (EAB) or magnet valve (i.e., electrically controlled pneumatic) and, more specifically to a multi-input brake enforcement module (MBEM) utilizing multiple switching power supplies.

2. Description of Related Art

Prior art locomotive air brakes, whether an EAB system or a magnetic valve system, require voltage on an input to hold off a penalty brake application. The EAB and magnet valve have different voltage requirements and, as a result, require individually monitored power supplies. Therefore, most brake interfaces are designed to interface to one or the other using a single simple switching power supply or use a mechanical relay method of interrupting power to initiate a penalty brake application. The use of a single apparatus to interface both the EAB and magnetic valve previously required a complex and complicated switching power supply. Furthermore, the use of mechanical relays in vital brake systems must be built such that failures, especially welded contacts, are highly improbable. In addition, mechanical relays must be inspected regularly and calibrated every two to six years.

Accordingly, a need exists for a system that can interface to either an EAB or magnetic valve without any type of modification and without the use of relays. A further need exists for a system that periodically tests important components to ensure that power can be removed from the locomotive air brake system regardless of component failure and without disrupting operability.

SUMMARY OF THE INVENTION

The present invention is directed to a brake interface module for an electronic air brake and a magnet valve. The brake interface comprises a positive train control circuitry, an AND gate with a first input, a second input and an output, a first power supply, a second power supply and three spare discrete input circuits. The positive train control circuitry, which is capable of digitally communicating with an external PTC system, comprises a first microcontroller with at least one input and at least one output, and a second microcontroller with at least one input and at least one output. The second microcontroller is operatively coupled to the first microcontroller. The first input of the AND gate is operatively coupled to an output of the first microcontroller, and the second input of the AND gate is operatively coupled to an output of the second microcontroller. The first microcontroller is responsible for external communications, communications with the second microcontroller, acting on digitally received messages, performing self test, and controlling the internal power supplies through a second, independent means. Similarly the second microcontroller is responsible for communication with the first microcontroller, acting on digitally received messages, performing self test, and controlling the internal power supplies through a second, independent means. The outputs of the first and second microcontrollers that directly control the first and second power supplies are logically combined so that both microcontrollers must agree to allow the power supplies to operate. This allows for an independent means of penalty brake application.

The first and second power supplies are operatively coupled to an output of the AND gate. The three spare discrete input circuits are combined with similar cutout circuits used to disable a failed or unused input. The outputs of the first power supply and the second power supply are diode ORed together to produce a single output used to satisfy an external locomotive air brake system. The spare input circuits must be properly driven, through correct digital messaging, proper discrete input voltages, or cutout, to allow the first and second power supplies to output voltages required to satisfy the air brake system. An unsatisfactory condition on any single input will shut off both the first and second power supplies and remove power to the air brake system.

The positive train control circuitry allows for switching between the first power supply and the second power supply to insure a correct voltage for proper operation of both the EAB and magnet valve.

Both the first microcontroller and the second microcontroller are required to act on digitally received messages. One such message may include the PTC command to enforce or not to enforce and is realized as a discrete output from each of the microcontrollers. A second PTC message may include a command to pulse an independent watchdog circuit. Each microcontroller has its own independent watchdog circuit. The positive train control module may further comprise a first watchdog circuit operatively coupled to the first microcontroller and a second watchdog circuit operatively coupled to the second microcontroller. The watchdog circuitry is set up such that successive pulses either too fast or too slow will latch a discrete signal. The first watchdog circuit and second watchdog circuit may be pulsed within an about 0.5 second to about 3.5 second window. These four PTC discrete signals from the microcontroller are logically combined to create a PTC Penalty Application signal. This PTC Penalty Application signal is logically combined with PTC cutout circuitry and the resultants of the three spare input/cutout logic circuits.

All spare input circuitry and cutout circuitry is designed to be fail-safe. In addition, the first and second microcontrollers continuously monitor their states. The two microcontrollers coordinate testing the shutdown capabilities of the first and second power supplies. Additional control circuitry is added that allows the microcontrollers to independently turn off each power supply by each of its independent means to ensure proper functionality. While one power supply is turned off, the second continues to operate allowing for uninterrupted operation at the external locomotive air brake.

The first power supply and second power supply may be internally diode-isolated. The brake interface module may further comprise a third power supply with at least one output. The third power supply may be operatively coupled by a transistor to the positive train control circuitry and the output of third power supply is operatively coupled to an external brake magnet valve. The brake interface module may be operatively coupled to at least two external processors. The at least two external processors may be operatively coupled to the brake interface module by a network bus.

The brake interface of the present invention may be referred to as a multi-input brake enforcement module (MBEM).

The present invention is also a method of interfacing an electronic air brake and a magnet valve. The method comprises the steps of providing a brake interface module as described hereinabove, operatively coupling the brake interface module to at least one external processor and operatively coupling the brake interface to the electronic air brake and magnet valve. A positive train control circuitry of the brake interface module allows for switching between a first power supply and a second power supply to insure a correct voltage for proper operation of both the electronic air brake and magnet valve.

Further details and advantages of the present invention will become apparent upon reading the following detailed description in conjunction with the accompanying drawings.

DETAILED DESCRIPTION OF THE INVENTION

The present invention will be described with reference to the accompanying figures wherein like reference numbers correspond to like elements throughout.

The present invention is directed to a brake interface module or MBEM 1 that interfaces a locomotive air brake system 2 comprising an EAB (not shown) and/or a magnet valve (not shown). MBEM 1 advantageously utilizes redundant power supplies that each generate the required voltage to hold off a brake penalty application when operating either the EAB or magnet valve. Further, MBEM 1 utilizes fail-safes and periodic self-checks to ensure that power can be removed from the EAB (for a penalty application) regardless of component failure in the brake interface module. Additionally, the present invention allows for real-time testing without disrupting the operability of MBEM 1.

Figure 1:
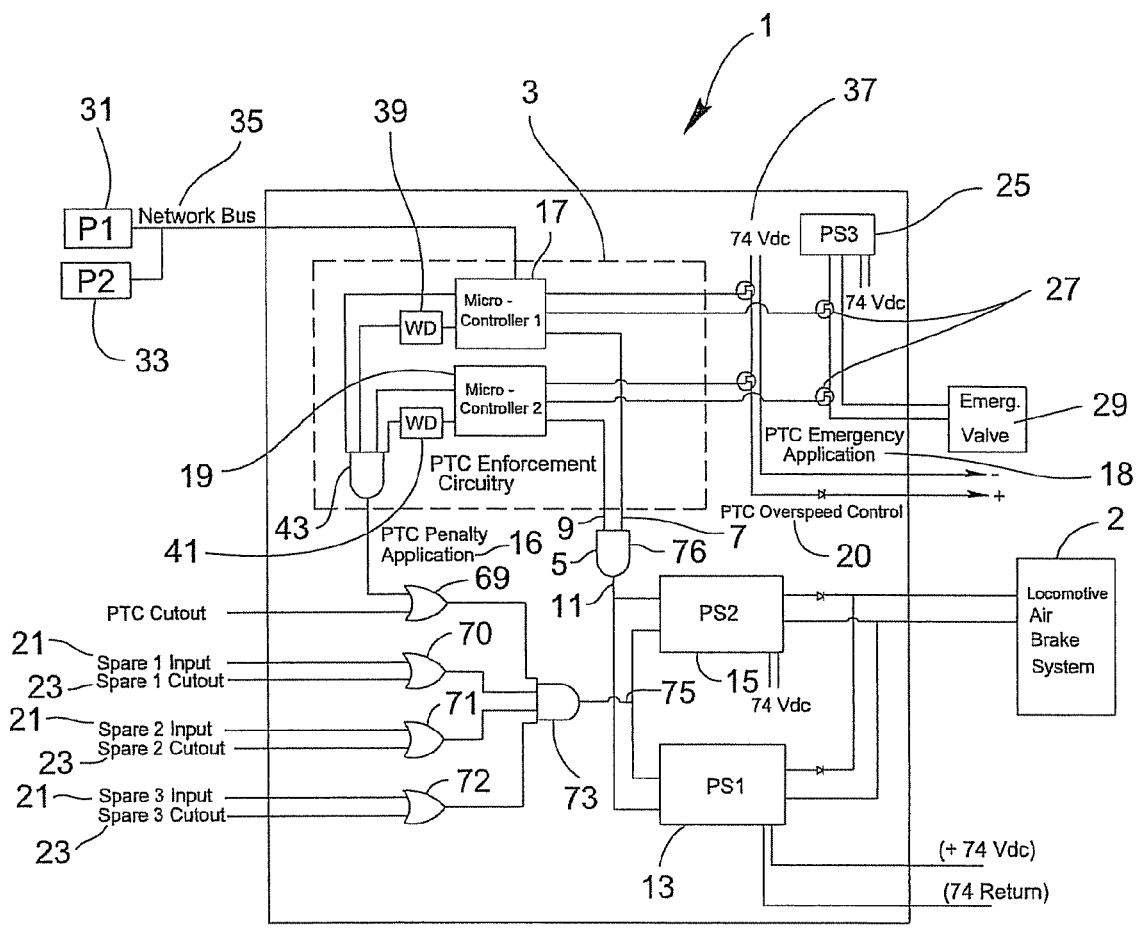
FIG. 1 is a schematic diagram of a brake interface module in accordance with the present invention.

With reference to FIG. 1, an MBEM 1 for an electronic air brake (EAB) and a magnet valve comprise positive train control (PTC) enforcement circuitry 3, an AND gate 5 with a first input 7 (i.e., "Neuron_SW_Shutdown"), a second input 9 (i.e., "AVR_SW_Shutdown") and an output 11, a first power supply 13 and a second power supply 15. PTC enforcement circuitry 3 comprises a first microcontroller 17 with a plurality of inputs and a plurality of outputs, and a second microcontroller 19 with a plurality of inputs and a plurality of outputs. First microcontroller 17 is operatively coupled to second microcontroller 19. First input 7 of AND gate 5 is operatively coupled to an output of first microcontroller 17 and second input 9 of AND gate 5 is operatively coupled to an output of second microcontroller 19. Output 11 of AND gate 5 is operatively coupled to first power supply 13 and second power supply 15. MBEM 1 is also operatively coupled to an input of an EAB (not shown) or to a normally opened penalty magnet valve (not shown).

PTC enforcement circuitry 3 of MBEM 1 permits operation of first power supply 13 and second power supply 15 to insure a correct voltage for proper operation of both the electronic air brake and magnet valve. MBEM 1 also performs positive train control (PTC) Enforcement Functionality that includes PTC Penalty Application, PTC Emergency Application, and PTC Overspeed Control. Activation of PTC Penalty Application 16 will remove a 32 Vdc output signal to the locomotive air brake system that is holding off braking.

MBEM 1 further includes a plurality of spare inputs 21 for operatively coupling MBEM 1 to, and for receiving input from, external devices. Spare inputs 21 allow other train-control systems and external devices to utilize Penalty Application.

Spare inputs 21 may be, but are not limited to, Penalty Application commands from separate external Automatic Train Control (ATC) systems. Each spare input 21, and a PTC Penalty Application input 16, is associated with a unique Cut-Out switch 23 that independently overrides the associated input to account for failure conditions or uninstalled inputs. Each Penalty Application input must be either valid or Cut-Out to hold off Penalty Application. However, this is not to be construed as limiting the present invention as other configurations have been envisioned. For instance, spare inputs 21 that have been uninstalled may be hardwired to a Cut-Out voltage supplied to MBEM 1 in lieu of installing a Cut-Out switch 23.

MBEM 1 holds off PTC Penalty Application by outputting a differential voltage to a normally open locomotive brake system comprising the EAB and magnet valve sourced by a first power supply 13 and a second power supply 15. First power supply 13 and second power supply 15 are internally diode-isolated thereby allowing the shutdown capability of either first power supply 13 or second power supply 15 to be individually tested without causing a Penalty Application. Penalty Application is only achieved by shutting down both first power supply 13 and second power supply 15.

MBEM 1 is operatively coupled to a plurality of external processors, and preferably a first external processor 31 and a second external processor 33, via a network bus 35.

MBEM 1 further includes a third power supply 25 with a plurality of outputs. Third power supply 25 is operatively coupled via transistors 27 to PTC enforcement circuitry 3 and at least one output of third power supply 25, which sources a PTC Emergency Application output 18, and is operatively coupled to an external brake magnet valve 29. Third power supply 25 may be an internal 32 Vdc power supply. A PTC Emergency Application is achieved by applying the voltage from third power supply 25 to external brake magnet valve 29, which is normally deenergized. Such an application can only be initiated when first external processor 31 and second external processor 33 simultaneously command the application. This is to minimize the chance of an erroneous PTC Emergency Application due to undesirable events resulting from PTC failures. The PTC Emergency Application does not interfere with other non-PTC means of achieving an emergency application. Emergency activation may be disabled through software provided on external processors 31 and 33 or by not installing emergency magnet valve 29. Operation of MBEM 1 does not change if the PTC Emergency Application option is not enabled.

MBEM 1 further includes a PTC Overspeed Control output 20 sourced from an MBEM 74 Vdc input power 37. PTC Overspeed Control is achieved by applying the voltage to an external system. Similar to PTC Emergency Application, PTC Overspeed Control can only be initiated when the first external processor 31 and the second external processor 33 simultaneously request the functionality. PTC Overspeed Control is necessary for PTC-equipped passenger trains to operate above 79 mph limits in certain PTC environments. PTC Overspeed Control is only available when PTC is Cut-In.

All functionality associated with PTC Penalty Application, Spare Inputs 21, Cut-Out switch inputs 23, and signal consolidation, are developed in a fail-safe manner. In an exemplary embodiment, all of these functions are incorporated as Class II hardware, as defined by AREMA. Any detected failure, including uninstalled or uninitialized inputs, will result in Penalty Application.

With further reference to FIG. 1, PTC Enforcement circuitry 3 receives messages from the first external processor 31 and the second external processor 33 via network bus 35, specifically an Enforcement Object within each processor. First microcontroller 17 and second microcontroller 19 provide redundant, parallel processing. Either microcontroller 17 or 19 is capable of commanding a Penalty Application when requested by its associated external processor 31 or 33. First microcontroller 17 and second microcontroller 19 must satisfy their own independent watchdog (WD) circuit, first watchdog circuit 39 and second watchdog circuit 41, respectively, within a specific time window to prevent PTC Penalty Application. The four signals (requested Penalty and WD Penalty from first microcontroller 17 and second microcontroller 19) are combined via an AND gate 43 to form PTC Penalty Application output 16. In order to release a Penalty Application from PTC Enforcement circuitry 3, PTC Penalty Application output 16 must be driven to a logical '1'. Any logical '0' into the input of AND gate 43 will drive its output to a logical '0' and result in a Penalty Application. PTC Penalty Application output 16 is further consolidated with other signals to control the MBEM Penalty Application (discussed in detail hereinafter).

While first microcontroller 17 and second microcontroller 19 are configured to command a PTC Penalty Application, each microcontroller 17 and 19 is capable of requesting an Emergency Application if commanded to do so by its associated external processor 31 and 33, respectively. A 32 Vdc signal will only be applied to PTC Emergency Application output 18 when both microcontrollers 17 and 19 are simultaneously issuing an Emergency Application request.

Similarly, PTC Overspeed Control output 20 will be driven to 74 Vdc when both microcontrollers 17 and 19 have enabled PTC Overspeed Control. Each Enforcement Object enables PTC Overspeed Control as the external processors 31 and 33 transition into the PTC Enabled State.

Since the loss of MBEM 1 power will result in a Penalty Application, first microcontroller 17 and second microcontroller 19 will command a Penalty Application and hold off an Emergency Application until PTC enforcement circuitry 3 is properly initialized by both first external processor 31 and second external processor 33. Prior to initialization, the locomotive can only be moved if PTC enforcement circuitry 3 is Cut-Out.

The time between power-up and system Cut-In will be regulated by operational procedures. Enough time must be given for the whole system to initialize. MBEM 1 initializes in approximately 1 second whereas a PTC system requires upwards to 30 seconds. An additional four-second delay is required to initialize MBEM 1 following the completion of individual external processor power-up sequences. At this point, the PTC system may be Cut-In without Penalty Application. The power-up time associated with the remaining Spare Inputs 21 is determined by an external system connected to the input. Once both the specific Spare Inputs 21 and MBEM 1 have completed individual power-up sequences, Spare Inputs 21 may be Cut-In without any additional delay.

First external processor 31 and second external processor 33 may include an Enforcement Object capable of transmitting at least three messages over network bus 35 to the PTC enforcement circuitry 3 within MBEM 1. The three messages are as follows: controlEnforcement, DontEnforce and Enforce. The first byte of these three messages contains originating external microprocessor data. First microcontroller 17 within MBEM 1 receives all communications from both first external processor 31 and second external processor 33. Depending on the originating external processor, first microcontroller 17 will either internally use the data or forward the message without modification to second microcontroller 19 such that each external processor 31 and 33 functionally controls one unique MBEM microcontroller.

Each microcontroller 17 and 19 has an external hardware watchdog circuit 39 and 41, respectively, that must be pulsed within an about 0.5 second to an about 3.5 (+/−10%) second window. Pulsing too fast or too slow will result in a PTC Penalty Application regardless of train location and state of PTC enforcement circuitry 3 (unless Cut-Out).

Pulsing watchdog circuits 39 and 41 are controlled by first microcontroller 17 and second microcontroller 19 but can only be initiated by a specific DontEnforce message from first external processor 31 and second external processor 33. Each external processor 31 and 33 transmits a DontEnforce message containing an incrementing 16-bit sequence number at a 1 Hz rate. First and second microcontrollers 17 and 19 validate the receipt of each sequence number by insuring it is at least one greater, but not more than three greater, than the last valid receipt. Valid sequence numbers initiate a pulse to first and second watchdog circuits 39 and 41 and then are stored for comparison with the next message. Microcontrollers 17 and 19 have no knowledge of the watchdog timing requirements, and therefore cannot intentionally defeat it.

At power-up, first and second microcontrollers 17 and 19 will not pulse watchdog circuits 39 and 41, respectively, until they are initialized by the corresponding external processors 31 and 33. Initialization is complete when microcontrollers 17 and 19 receive three consecutive 'valid' DontEnforce messages. Upon initialization, watchdog circuits 39 and 41 will be pulsed and the watchdog latch is reset. The outputs from each of the watchdog latches are fed to AND gate 43. When both external processors 31 and 33 have initialized their corresponding microcontroller 17 and 19, respectively, PTC Penalty Application will be released (assuming first and second external processors 31 and 33 remain healthy and do not command a Penalty Application).

Once first microcontroller 17 and second microcontroller 19 are initialized, each microcontroller 17 and 19 is capable of receiving PTC initiated penalty or emergency brake application requests from its associated external microprocessor 31 and 33, respectively, independent of normal crew/locomotive operation. The Enforce message contains an 8-bit number. Normal initiation of a PTC Penalty Application is under software control. If PTC Penalty Application has been enabled, receipt of any Enforce message, excluding the one noted below, will cause the appropriate microcontroller 17 or 19 to set its penalty output to a logic '0'. This action propagates through AND gate 43 thereby resulting in a PTC Penalty Application. For example, and without limiting the present invention, if the received value is exactly "10001100", an emergency enforcement is being requested as discussed hereinafter.

If a locomotive has not been PTC Enabled, MBEM 1 will ignore the Penalty Application command unless a Reserved Penalty, for instance a value of "01000100", is received. This provision has been established to allow either external processor 31 or 33 to apply a Penalty Application regardless of train state (e.g., in the event of a PTC safety-critical failure that warrants a Penalty Application). When a Penalty Application is commanded from either one or both of external microprocessors 31 or 33, external microprocessors 31 and 33 will replace the 1 Hz DontEnforce message with the Enforce message.

Absence of valid data in the DontEnforce message or lack of the message itself results in PTC Penalty Application from watchdog circuits 39 and 41, as well as from the direct command path, because watchdog circuits 39 and 41 time out when microcontrollers 17 and 19 fail to pulse them after 3.5 seconds.

External processors 31 and 33 can release a commanded PTC Penalty Application by suspending the Enforce message and reverting back to the DontEnforce message. Similar to initialization, the PTC Penalty Application will be released after the latches of both watchdog circuits 39 and 41 are reset following a third valid DontEnforce message received from the associated external processor. Control of the release of enforcement, to allow rolling release of a passenger train and to enforce a freight train to a stop, is implemented in the software of external processors 31 and 33. The software of external processors 31 and 33 determines whether enforcement can be released and sends the appropriate DontEnforce or Enforce messages. MBEM 1 then proceeds to respond to those messages.

The requested Penalty Application and watchdog outputs from both microcontrollers 17 and 19 are consolidated into a single PTC Penalty Application signal sent over PTC Penalty Application output 16 internal to MBEM 1. The manner in which the circuitry uses the PTC Penalty Application signal is explained hereinafter.

A PTC Emergency Application received at PTC Emergency Application output 18 is also under software control; however, unlike PTC Penalty Application, it requires both microcontrollers 17 and 19 to simultaneously request PTC Emergency Application for MBEM 1 to initiate a PTC Emergency Application. The software in each microcontroller 17 and 19 requires that 1) a PTC Emergency Enforcement function has been enabled; 2) the associated external processor 31 or 33 is currently commanding a PTC Penalty Application; and 3) receipt of an Emergency Application request. For example, and without limiting the present invention, receipt of the Enforce message containing data bit field "10001100", while commanding a Penalty Application, will request an Emergency Application from first microcontroller 17 related to first external processor 31. This process must occur from both external processors 31 and 33 and in both microcontrollers 17 and 19 for MBEM 1 to output an Emergency Application signal to PTC Emergency Application output 18.

Cancellation of the emergency request will occur if an Enforce message indicating anything other than emergency is received, or upon a PTC Penalty Application reset. This implies that once either first processor 31 or second processor 33 determines that an Emergency Application is necessary, only the "10001100" pattern will be transmitted until the need subsides. It must be noted that the Penalty Application, which is a prerequisite for Emergency Application, will also continue until both processors 31 and 33 stop sending the Enforce command, and resume sending the DontEnforce command, and three correct messages in sequence are received by each microcontroller 17 and 19.

The PTC Emergency Application is a configured option. It is only enabled, via functional negotiation, for specific types of locomotives. It is also implemented only on specific locomotives. If the capability is not implemented, there will be no effect if the option is erroneously negotiated "on" and the software attempts an Emergency Application.

The PTC Overspeed Control received at PTC Overspeed Control output 20 is a signal output to the locomotive controller to defeat the built-in speed governor on the locomotive. This is necessary to allow operation over a speed limit set by the speed governor in certain environments. If the locomotive controller does not receive energy from PTC Overspeed Control output 20, it assumes that the speed will never exceed the speed limit set by the speed governor. In an exemplary embodiment, the built-in speed governor is set at about 79 miles per hour.

PTC Overspeed Control is similar to PTC Emergency Application in that it requires both microcontrollers 17 and 19 to request overspeed control, for MBEM 1 to transition its output as functionally shown in FIG. 1. Receipt of a controlEnforcement message with the Overspeed Control bit set to '1' from the associated external processor 31 or 33 will request Overspeed Control from the single microcontroller related to that external processor. This process must occur in both microcontrollers 17 and 19 for MBEM 1 to output a PTC Overspeed Control signal to PTC Overspeed Control output 20.

Releasing the PTC Overspeed Control output 20 is achieved when either microcontroller 17 or 19 receives an Overspeed Control bit set to '0'. Note that the controlEnforcement message is not periodic, but instead is latched within the microcontroller. It is nominally reset to "no control" when the OBC transitions out of the PTC-Enabled state. It is also released whenever microcontroller 17 or 19 is reset, power is removed from MBEM 1 or PTC is Cut-Out.

Figure 2:
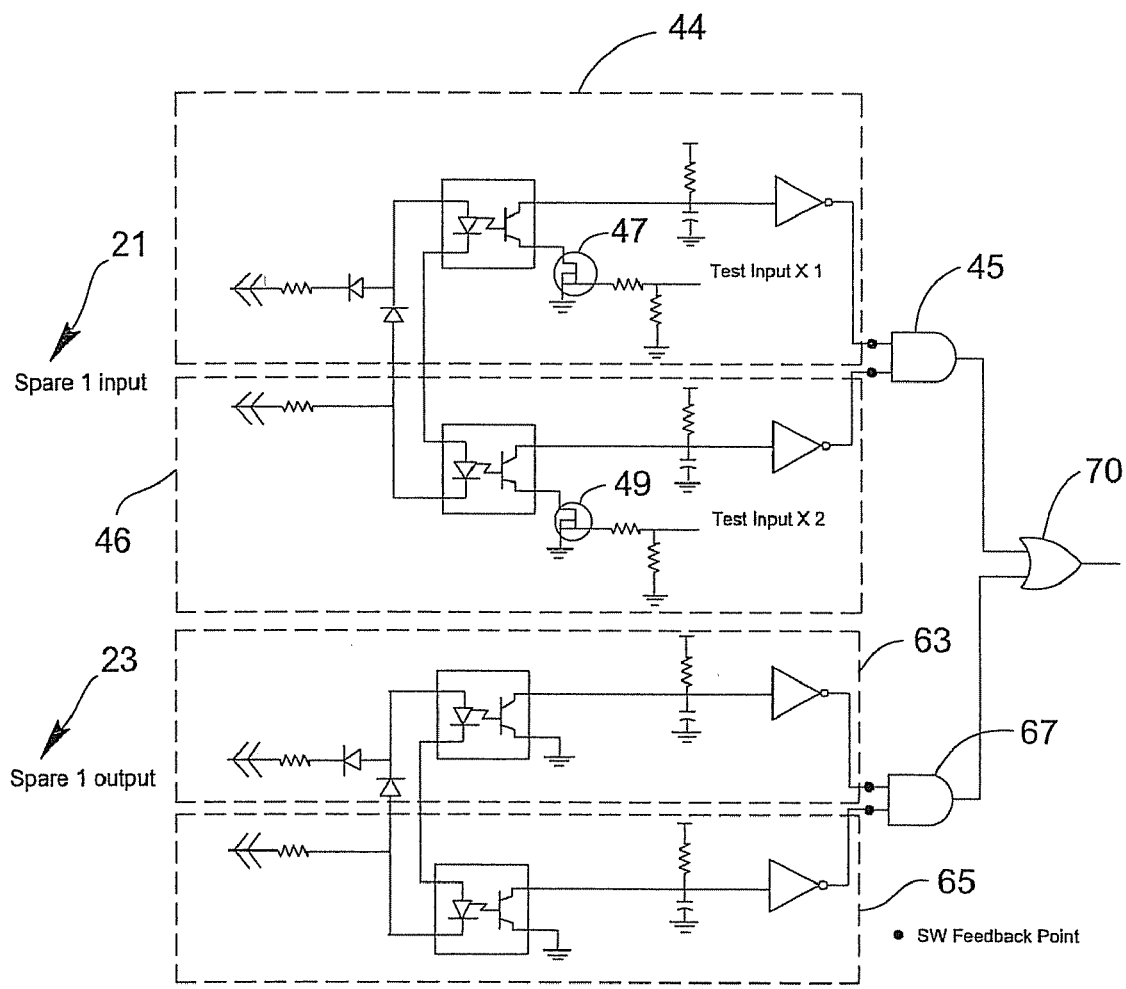
FIG. 2 is a schematic diagram of the spare input and cutout receiver channel of FIG.

With reference to FIG. 2 and with continuing reference to FIG. 1, MBEM 1 is capable of receiving up to three additional external Penalty Application signals from external train control or train cab signal systems via spare inputs 21. FIG. 2 illustrates an exemplary embodiment of a spare input 21 and cutout 23. Spare inputs 21 are fully isolated from each other in MBEM 1 without the use of common component packaging. A nominal 32 Vdc differential signal applied to the input activates the output of 'input circuitry' and holds off Penalty Application. Input circuitry includes a simple RC circuit that provides a 250 msec delay to the Penalty Application. This allows an external driving system to validate its ability to enforce by removing its 32 Vdc output for less than 250 msec.

Each of the inputs provides a fail-safe signal and is developed using redundant optoisolator and isolated receiver circuitry that must provide both active high and low inputs to hold off Penalty Application. Each input 21 includes a first receiver half 44 and a second receiver half 46. Each receiver half 44 and 46 drives an input of AND gate 45 as shown in FIG. 2. A failure of either half 44 or 46 results in Penalty Application. Furthermore, second microcontroller 19 continuously monitors both halves 44 and 46 for consistency (both permissive or both non-permissive). Any discrepancy between the two halves will result in Penalty Application via AVR_SW_Shutdown 9. AVR_SW_Shutdown 9 is an independent path not affected by failed input circuitry.

With a valid, permissive input signal (inputs to AND gate 45 both high), any failure that causes a receiver half to fail in a non-permissive manner (AND gate 45 input transitions low) will 1) be detected by second microcontroller 19 software and result in Penalty Application, and 2) logically change AND gate 45 output to low, again resulting in Penalty Application, assuming that since the signal was permissive it was also Cut-In. Receiver halves 44 and 46 that fail to a permissive state will remain latent. These latent failures result in a permissive condition and are considered hazardous and require mitigation through periodic self-test. As such, each receiver half 44 and 46 has been designed with a FET 47 and 49, respectively, controlling the circuit's ground. During a periodic self-test, the ground can be removed and the circuit output monitored for correct response. This process tests all failures of concern and results in a Penalty Application under failure condition.

With a non-permissive input it is assumed that the function has also been Cut-Out to hold off Penalty Application. Failures in this state (Cut-Out) are not of interest because no unsafe failures are present. The self-test will detect any deficiencies when the function is Cut-In. The potential for latent permissive failures requires that all receiver inputs be periodically tested. The self-test can be set to run at any sufficient time interval.

Each input, the PTC Penalty Application input 16, along with the three spare inputs 21, is associated with its own cutout 23. Similar to spare inputs 21, each cut-out input 23 is treated as a fail-safe signal and is developed using redundant optoisolator and isolated receiver circuitry. Each Cut-Out input 23 includes a first receiver half 63 and a second receiver half 65 that drives an input of an AND gate 67 as shown in FIG. 2. Failures of either half 63 or 65 result in a safe Cut-In state for the associated MBEM input. Furthermore, second microcontroller 19 continuously monitors both halves 63 and 65 for consistency (both Cut-In or both Cut-Out). Any discrepancy between the two halves 63 and 65 will result in Penalty Application via SW_Shutdown. As described above, SW_Shutdown is an independent path not affected by a failed Cut-Out switch.

While Cut-Out (i.e. inputs to AND gate 67 are both high), any failure that causes a receiver half 63 or 65 to Cut-In (i.e. AND gate 67 input transitions low) will 1) be detected by software and result in a Penalty Application, and 2) logically change AND gate 67 output low again resulting in a Penalty Application, assuming that since the signal was Cut-Out, the input is not permissive. Receiver halves 63 and 65 that fail to the Cut-Out state will remain latent until they are Cut-In. At Cut-In, software will detect the discrepancy between the two halves 63 and 65 and apply a Penalty Application. In the event both halves 63 and 65 have failed to a Cut-Out state, the specific input will remain Cut-Out without detection. However, per rule, as each function is Cut-In, it must pass a departure test prior to service and this will detect the failed state. In this instance, no unsafe failures are present.

While Cut-In (i.e. inputs to AND gate 67 are both low), any failure that causes a receiver half 63 or 65 to Cut-Out (i.e. AND gate 67 input transitions high) will be detected by software and result in a Penalty Application. Receiver halves 63 and 65 failing to the Cut-In state are latent but considered a safe side failure. The failure will logically keep AND gate 67 output low so removal of the permissive input signal will result in Penalty Application. No unsafe failures are present in this situation. Since the Cut-Out switch circuitry contains no unsafe failure modes, no real time testing of circuitry is required.

PTC Penalty Application input 16 and each of the Spare Inputs 21 (i.e., output of AND gate 45 that combines the redundant receiver logic) are connected to an OR gate 69-72 along with the associated Cut-Out input (i.e., output of AND gate 67). The input is required to be either valid or appropriately Cut-Out to drive the output of OR gate 70 high as shown in FIG. 2.

The outputs of the four OR gates 69-72 drive an AND gate 73 as shown in FIG. 1. The output 75 of AND gate 73 is referred to hereinafter as PS Shutdown 1. PS Shutdown 1 75 is the primary means of shutting down first and second power supplies 13 and 15 thereby initiating a Penalty Application.

Both microcontrollers 17 and 19 have been developed with a single discrete output 7 and 9, respectively, which provides a second, independent means of power supply shutdown. AND gate 5 combines the signals 7 and 9, referred to hereinafter as PS Shutdown 2 76, so that either side may invoke a Penalty Application.

Second microcontroller 19 is capable of continuously monitoring the important signals of MBEM 1 due to its ability to access an internal bus (not shown). All Spare Input 21 and Cut-Out 23 receiver halves are monitored to insure consistency between halves. Any split inputs are flagged for maintenance and result in a Penalty Application via PS Shutdown 2 76. In addition, commanded Penalty Application, characterized as the removal of power to Spare Inputs 21, will be detected by software and results in PS Shutdown 2 76 going low. This provides a second independent path for a Penalty Application in the rare event that the primary hardware path, PS Shutdown 1 75, has failed permissive since last test. Second microcontroller 19 will also invoke a Penalty Application, via PS Shutdown 2 76, if the test fails in the bypass mode or if any tests fail during periodic self-test.

First power supply 13 and second power supply 15 allow for real-time testing without undesired Penalty Application. Either power supply 13 or 15 may be shutdown without disrupting the output of MBEM 1. A Penalty Application is only achieved when both power supplies 13 and 15 are simultaneously shutdown. Each power supply 13 and 15 has two independent means of shutting down its output and requires positive assertion to output a voltage and therefore release a Penalty Application.

Penalty Application output voltage of MBEM 1 may be, for example, a floating, isolated 32 Vdc +/−10% signal, with a current capability of 0.8 A. Nominal current may be, for example, approximately 0.39 A (82 ohm coil). Wiring to the locomotive brake system is protected from leakage and shorts by using, for example, a separately shielded, 16-gauge stranded copper wire, that is isolated from all power sources that can defeat an enforcement capability. Isolation of 2000 Vac with a limit of 1.5 mA/kV leakage may be achieved, for example, through the use of silicone rubber coated fiberglass protective sheathing. Each power supply 13 and 15 contains, for example, a single transformer, controlled by a single pulse width modulator (PWM), and creates an about 32 Vdc differential over an isolated output loop with no external connections. Power supply shut down is achieved by shutting the PWM down, which prevents fields being generated in the transformer, and removes power from the isolated output circuit. No single short of any type, including to the locomotive power or the locomotive ground, to this isolated circuit will prevent a Penalty Application. This is equivalent to a traditional double break system.

The assertion of PS Shutdown 1 75 is maintained by keeping the inputs to AND gate 73 high. PS Shutdown 1 75 is common to both first power supply 13 and second power supply 15 and controls an FET (not shown) that allows operating power to be supplied to the PWM of first power supply 13 and second power supply 15. Pulling PS Shutdown 1 75 to ground denies the PWM of first power supply 13 and second power supply 15 operating power and results in no power supply output, causing a Penalty Application. This is the first of two methods of achieving a Penalty Application.

The second method of achieving a Penalty Application is as follows. The assertion of PS Shutdown 2 76 by either of the associated microcontrollers 17 and 19 enables hardware that allows the PWM of first power supply 13 and second power supply 15 to operate normally. If either of the associated microcontrollers 17 and 19 pulls PS Shutdown 2 76 low, it forces the compensation input of the PWM of first power supply 13 and second power supply 15 to ground which shuts down the PWM, resulting in a Penalty Application.

Figure 3:
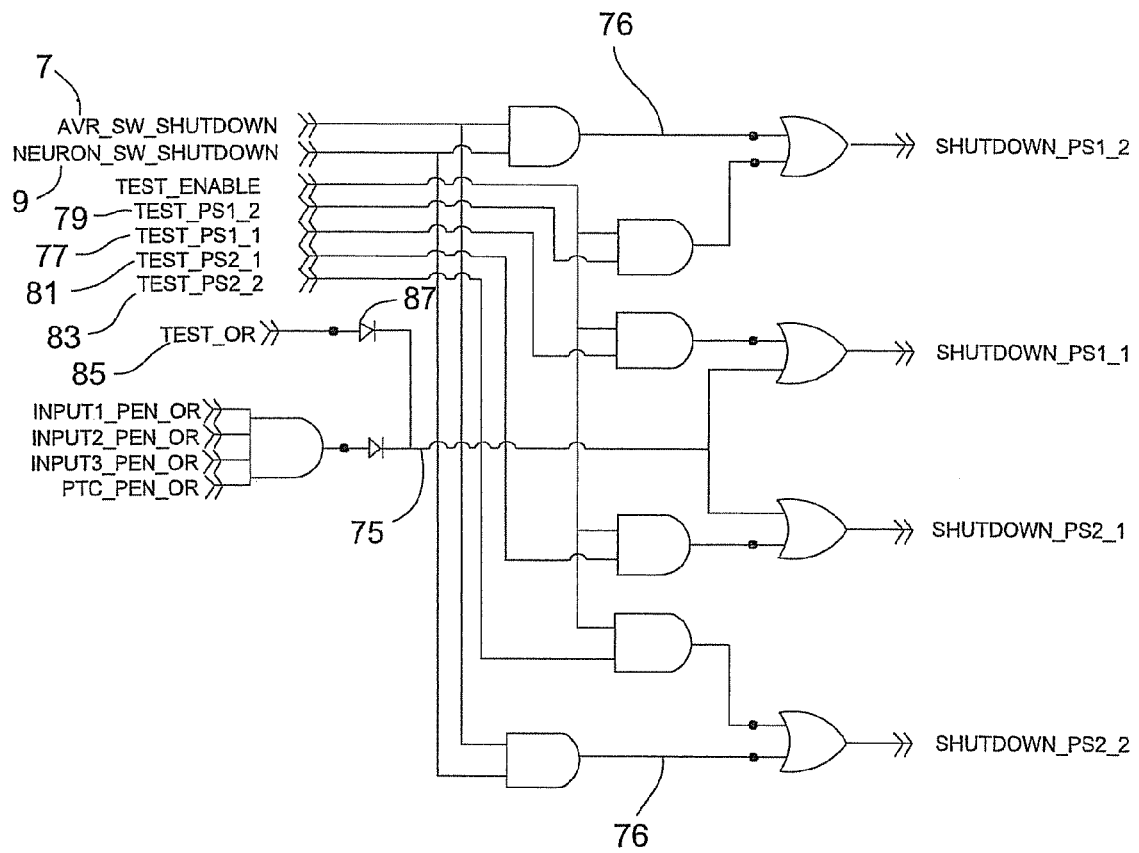
FIG. 3 is a schematic drawing illustrating a test for a power supply of the brake interface module in accordance with the present invention

With reference to FIG. 3 and with continuing reference to FIGS. 1 and 2, second microcontroller 19 has prime responsibility for testing and monitoring of MBEM 1 because of its bussing ability, but it must work with first microcontroller 17 in a coordinated manner.

The Penalty Application power is monitored by an A/D converter (not shown). Each 32 Vdc output is referenced to a common through a series of very large resistors (acting as a voltage divider) and centered at, for example, about 1.25 Vdc. The A/D inputs from the common and either high side will always be equal and opposite voltage from the about 1.25 Vdc reference (also an A/D input). This makes it possible for software to see if first power supply 13 and second power supply 15 are outputting voltage or not or if any of the output lines are shorted.

The addition of four internal test discretes and test logic as shown in FIG. 3 allows each of the four power supply shutdown methods to be periodically exercised in the following manner. A generalization of each of these tests is as follows:

(A) 1) Assert "Test_PS1_1" 77, 2) second microcontroller 19 commands a PTC Penalty Application, and 3) second microcontroller 19 uses the A/D feedback to ensure first power supply 13 has shut down and resets the test set-up.

(B) 1) Assert "Test_PS1_2" 79, 2) second microcontroller 19 commands a SW shutdown, and 3) second microcontroller 19 uses the A/D feedback to ensure that first power supply 13 has shut down and resets the test set-up.

(C) 1) Assert "Test_PS2_1" 81, 2) first microcontroller 17 commands a PTC Penalty Application, and 3) second microcontroller 19 uses the A/D feedback to ensure that second power supply 15 has shut down and resets the test set-up.

(D) 1) Assert "Test_PS2_2" 83, 2) first microcontroller 17 commands a SW shutdown, and 3) second microcontroller 19 uses the A/D feedback to ensure that second power supply 15 has shut down and resets the test set-up.

This test sequence verifies that all primary means of microcontroller Penalty Application and power supply shutdown are functional. These tests can be completed within, for example, about 1 second.

Any detected test failure (e.g., second microcontroller 19 commanded PTC Penalty Application fails to shutdown first power supply 13 as described in test (A) above) will immediately result in second microcontroller 19 requesting a Penalty Application through alternate means (i.e., Second microcontroller 19 commands a SW_shutdown). Similarly, all test discretes are continuously monitored and any uncommanded assertion (e.g., "Test_PS1_1" 77 sensed high while not being tested) will result in Penalty Application.

A test discrete, "Test_OR" 85 as shown in FIG. 3, has been implemented that overrides through voltage isolating diode 87 the consolidated Penalty Application signal (i.e., PS Shutdown 1 75). Both the test discrete and consolidated Penalty Application signal are monitored prior to their respective isolating diode. This override allows all means of applying a Penalty Application to be tested without affecting the power supplies 13 and 15.

Each of the following signal paths are tested with the "Test_OR" 85 test discrete asserted: Second microcontroller 19 PTC Penalty Application, First microcontroller 17 PTC Penalty Application, Spare 1 Input A, Spare 1 Input B, Spare2 Input A, Spare2 Input B, Spare3 Input A, Spare3 Input B.

Second microcontroller 19 and first microcontroller 17 PTC Penalty Application discretes are under software control and can be tested without special circuitry. Each spare input receiver half has been implemented with a FET that controls the circuit's ground and is controlled by a unique test discrete. Sequentially removing the ground from each receiver half simulates requested Penalty Application and insures that all circuitry is properly working. Note that these tests only work when the Spare Input has power applied to the input (Cut-In). These tests are also very quick (<1 sec) without effect on power supplies.

Again, any detected failure, within receiver circuitry or test discretes, will result in immediate Penalty Application via "AVR_SW_Shutdown" 9. Additionally, each Spare Input is monitored by software for consistency between receiver halves. Any discrepancy will be detected and result in a Penalty Application regardless of the signals' Cut-In/Cut-Out status.

Each Cut-Out switch input receiver in MBEM 1 is implemented with redundant circuits where the primary failure mode forces the associated input signal to be Cut-In. Latent failures of the Cut-In input detection circuits are eliminated by software monitoring of their state for consistency. No special tests are required because of the fail-safe nature of the circuitry. Detected failures result in immediate Penalty Application.

Again utilizing the Test_OR 85 test signal, each microcontroller 17 and 19 can test its own unique hardware watchdog circuit 39 and 41, respectively, by 1) pulsing it on in rapid succession and 2) withholding the pulse. Each test is monitored to ensure that a Penalty Application is commanded. Each microcontroller 17 and 19 will require about 5 seconds to complete its watchdog tests. Both sides combined take about 10 seconds. Within this time, the HW path for Penalty Application is being overridden. Commanded Penalty Application from any source (external processor 31 or 33 initiated or from a spare input 21) is not compromised due to software monitoring of the inputs (network and spare receivers). Upon commanded Penalty Application, the software will terminate all tests and command the Penalty Application via "AVR_SW_Shutdown" 9.

Watchdog timers are used to detect erroneous operation from external processors 31 and 33 or communication path and do not effect normally commanded Penalty Applications. Given that a permissive failure does not affect normal operation, the fact that the normal Penalty Application path is overridden during the test, and the length of time required to complete the watchdog test, this test is scheduled less frequently. Any detected watchdog failures result in an immediate Penalty Application via "AVR_SW_Shutdown" 9. The input voltage to the switching circuitry as well as its output is monitored through the A/D converter.

The output 20 of the PTC Overspeed Control is monitored by software. While the system is not PTC Enabled, assertion of the PTC Overspeed Control will result in immediate Penalty Application via "AVR_SW_Shutdown" 9. The state of the PTC Overspeed Control output 20 is continuously reported to external processor 31 and 33 within a status message. Failing to receive a PTC Overspeed Control indication while in PTC Enable state will cause external processors 31 and 33 to apply a conventional speed restriction to the PTC system.

The status of internal microcontrollers 17 and 19 states, monitored traces, test signals, and test results are all reported to both first external processor 31 and second external processor 33 over network bus 35 by second microcontroller 19 at a rate of, for example, about 1 Hz. This provides each external processor 31 and 33 with a view of MBEM 1. Action can be taken by either external processor 31 or 33 to protect against any detected irregularity.

MBEM 1 may be designed, for example, with Class II hardware, is a self-checking device and satisfies the safety assurance concept of intrinsic fail-safe design. The use of simple components has facilitated the identification of unsafe failure modes so that they could be eliminated or made detectable through design or test. Redundant, self-checking hardware addresses most unsafe receiver failures. The remaining cases are addressed by exhaustive testing and monitoring by internal software. Additional logic gates are used in MBEM 1 circuitry allowing 100% of all circuitry to be periodically tested in real time without Penalty Application. Software continuously monitors the circuitry via feedback discretes, both in and out of test mode, and insures that enforcement related circuitry is functioning properly. The MBEM also supplies both external processors 31 and 33 with a feedback message containing the internal state of MBEM 1, self-test results, and status of all monitored traces.

While the present invention was described with reference to preferred embodiments of the brake interface module, those skilled in the art may make modifications and alterations to the present invention without departing from the scope and spirit of the invention. Accordingly, the above detailed description is intended to be illustrative rather than restrictive. The invention is defined by the appended claims and all changes to the invention that fall within the meaning and range of equivalency of the claims are to be embraced by their scope.

The invention claimed is:

1. A brake interface module for an electronic air brake (EAB) and/or a magnet valve comprising:
   a) a positive train control circuitry comprising:
      i) a first microcontroller with at least one input and at least one output; and
      ii) a second microcontroller with at least one input and at least one output, the second microcontroller operatively coupled to the first microcontroller; and
      iii) first combinational logic circuitry with at least a first input, a second input and an output, the first input operatively coupled to an output of the first microcontroller and the second input operatively coupled to an output of the second microcontroller;
   b) at least one spare input for operatively coupling the brake interface module to, and for receiving input from, external devices;
   c) second combinational logic circuitry with at least one input and at least one output, at least one input of the second combinational logic circuitry operatively coupled to the at least one spare input;
   c) a first power supply operatively coupled to the at least one output of the second combinational logic circuitry; and
   d) a second power supply operatively coupled to the at least one output of the second combinational logic circuitry,
   wherein the positive train control circuitry allows for switching between the first power supply and the second power supply to insure a correct voltage for proper operation of at least one of the EAB and magnet valve.

2. The brake interface module of claim 1, wherein the first microcontroller and the second microcontroller provide redundant, parallel processing.

3. The brake interface module of claim 1, wherein the first power supply is diode-isolated.

4. The brake interface module of claim 1, wherein the second power supply is diode-isolated.

5. The brake interface module of claim 1, wherein the brake interface module is operatively coupled to at least two external processors.

6. The brake interface module of claim 5, wherein the positive train control module further comprises a first watchdog circuit operatively coupled to the first microcontroller and a second watchdog circuit operatively coupled to the second microcontroller, the first and second watchdog circuits controlled by the external processors.

7. The brake interface module of claim 6, wherein the first watchdog circuit and second watchdog circuit are pulsed within about a 0.5 to 3.5 second window, further wherein the window is determined by at least one of the external processors.

8. The brake interface module of claim 5, wherein the at least two external processors are operatively coupled to the brake interface module by a network bus.

9. The brake interface module of claim 1 further comprising:
   e) a third power supply with at least one output, the third power supply operatively coupled by a transistor to the positive train control circuitry and the output of third power supply is operatively coupled to an external brake magnet valve.

10. The brake interface module of claim 9, wherein the third power supply is independently driven by the first microcontroller or the second microcontroller.

11. A method of interfacing an electronic air brake and/or a magnet valve comprising the steps of:
   a) providing a brake interface module comprising:
      i) a positive train control circuitry comprising:
         1) a first microcontroller with at least one input and at least one output; and
         2) a second microcontroller with at least one input and at least one output, the second microcontroller operatively coupled to the first microcontroller; and
         3) first combinational logic circuitry with at least a first input, a second input and an output, the first input operatively coupled to an output of the first microcontroller and the second input operatively coupled to an output of the second microcontroller;
      ii) at least one spare input for operatively coupling the brake interface module to, and for receiving input from, external devices;
      iii) second combinational logic circuitry with at least one input and at least one output, at least one input of the second combinational logic circuitry operatively coupled to the at least one spare input;
      iv) a first power supply operatively coupled to the at least one output of the second combinational logic circuitry; and
      v) a second power supply operatively coupled to the at least one output of the second combinational logic circuitry;
   b) operatively coupling the brake interface module to at least one external processor;
   c) operatively coupling the brake interface to the electronic air brake and/or magnet valve,
   wherein the positive train control circuitry allows for switching between the first power supply and the second power supply to insure a correct voltage for proper operation of at least one of the electronic air brake and magnet valve.

12. The method of claim 11, wherein the first microcontroller and the second microcontroller provide redundant, parallel processing.

13. The method of claim 11, wherein the first power supply is diode-isolated.

14. The method of claim 11, wherein the second power supply is diode-isolated.

15. The method of claim 11, wherein the brake interface module is operatively coupled to at least two external processors.

16. The method of claim 15, wherein the positive train control module further comprises a first watchdog circuit operatively coupled to the first microcontroller and a second watchdog circuit operatively coupled to the second microcontroller, the first and second watchdog circuits controlled by the external processors.

17. The method of claim 16, wherein the first watchdog circuit and second watchdog circuit are pulsed within about a 0.5 to 3.5 second window, further wherein the window is determined by at least one of the external processors.

18. The method of claim 15, wherein the at least two external processors are operatively coupled to the brake interface module by a network bus.

19. The method of claim 11, wherein the brake interface module further comprises:
    vi) a third power supply with at least one output, the third power supply operatively coupled by a transistor to the positive train control circuitry and the output of third power supply is operatively coupled to an external brake magnet valve.

20. The method of claim 19, wherein the third power supply is independently driven by the first microcontroller or the second microcontroller.

* * * * *

UNITED STATES PATENT AND TRADEMARK OFFICE
CERTIFICATE OF CORRECTION

PATENT NO.        : 7,529,610 B1                                    Page 1 of 1
APPLICATION NO.   : 12/342275
DATED             : May 5, 2009
INVENTOR(S)       : Fenske et al.

It is certified that error appears in the above-identified patent and that said Letters Patent is hereby corrected as shown below:

Column 13, line 52, Claim 1, "c)" should be -- d) --

Column 13, line 55, Claim 1, "d)" should be -- e) --

Column 14, line 20, Claim 9, "e)" should be -- f) --

Signed and Sealed this

Eighth Day of September, 2009

David J. Kappos
*Director of the United States Patent and Trademark Office*